(12) United States Patent
Haas

(10) Patent No.: US 6,634,376 B2
(45) Date of Patent: Oct. 21, 2003

(54) BACK FLOW PREVENTING EDUCTOR

(75) Inventor: Richard Haas, Cincinnati, OH (US)

(73) Assignee: Hydro Systems Company, Cincinnati, OH (US)

( * ) Notice: Subject to any disclaimer, the term of this patent is extended or adjusted under 35 U.S.C. 154(b) by 0 days.

(21) Appl. No.: 09/931,354

(22) Filed: Aug. 16, 2001

(65) Prior Publication Data

US 2003/0034078 A1 Feb. 20, 2003

(51) Int. Cl.$^7$ .............................. F04F 5/00; F16K 15/14
(52) U.S. Cl. .................... 137/143; 137/853; 137/895
(58) Field of Search .................. 137/143, 853, 137/895

(56) References Cited

U.S. PATENT DOCUMENTS

| | | | | |
|---|---|---|---|---|
| 4,063,555 A | * | 12/1977 | Ulinder | .................. 604/83 |
| 4,171,007 A | * | 10/1979 | Bouteille | ............... 137/601.19 |
| 6,059,038 A | * | 5/2000 | Vick, Jr. | .................... 166/319 |
| 6,240,983 B1 | * | 6/2001 | Beldham et al. | ............ 141/100 |

* cited by examiner

Primary Examiner—Stephen M. Hepperle
(74) Attorney, Agent, or Firm—Wood, Herron & Evans, LLP

(57) ABSTRACT

An anti-backflow eductor has a resilient sealing sleeve disposed on a water port defining blind end tube. The sleeve has a thinner wall cross section at a discharge end to enhance sealing while facilitating increased water flow. The ports in the blind end tube extend into a radial tube flange at the tube's inlet end to facilitate water flow out of the ports between the sleeve and tube. A tapered seat in the housing, together with cross bars in the vents, reduces the air vent cross section and relative motion between sleeve and housing to reduce sleeve wear. The eductor comprises an anti-backflow housing and a venturi housing coupled together for relative rotation but being inseparable under normal conditions to inhibit venturi use without the anti-backflow function of the anti-backflow housing.

8 Claims, 1 Drawing Sheet

BACK FLOW PREVENTING EDUCTOR

FIELD OF THE INVENTION

This invention relates to back flow preventing eductors for mixing of liquid chemicals with water, where the water source must be protected against contamination by backflow.

BACKGROUND OF THE INVENTION

Eductors are used for mixing liquid chemicals with water. For instance, such devices are used in the custodial arts to formulate small batches of cleaning solutions by mixing a chemical concentrate with water. Water running through the venturi causes the liquid concentrate to be drawn into the venturi, where it is mixed with water and subsequently discharged. In this manner, a dilute solution is formed.

The drawback to mixing devices of this type is the potential for negative water source pressure, or "back siphoning" of chemicals into the source of the water supply. When such a drawback occurs, the entire water supply is in jeopardy of contamination. In order to alleviate such a potential hazard, air gap eductors are used to prevent any negative source pressure from drawing chemicals or contaminated water back into the water source. Such devices prevent the drawback of chemicals to the upstream source. Many water regulatory authorities require such devices to be used when diluting and dispensing chemicals in this manner.

Yet such air gap eductors themselves exhibit certain problems. One problem encountered in the use of such devices is the undesired mixture of air along with the chemical concentrate and the water. The introduction of air into the venturi system during operation causes the production of excessive foam. This phenomenon is undesirable, as it prematurely causes the container to be filled with foam rather than liquid. The foam rapidly fills the container and results in an overflow, while the container is only partially filled with the liquid mixture. Such a process is inefficient and causes a loss of both time and product.

Another related problem is the tendency for air gap devices to mist or spit water outwardly of the air gap device. This spray, and the resulting drips are annoying, and over a period of time can cause damage to the wall on which the device is mounted, or puddles on the floor.

These problems with air gap eductors were claimed to have been minimized by the anti-foam, splash-proof venturi device of U.S. Pat. No. 6,240,983. The '983 patent describes a venturi device with a resilient sleeve check valve between the water inlet and the venturi. The asserted benefits of this sleeve are threefold. First, upon water flow, the sleeve expands to seal off air from flowing into the supplied water and, it is asserted, effectively reduces the amount of foam produced at the outlet of the venturi. The second claimed asserted benefit of the '983 patent is the elimination of leakage previously experienced in some open air gap eductors. The sleeve used in this device acts as a barrier and confines all fluids to the interior of the venturi device. The last asserted benefit of the '983 patent is that the sleeve insert acts to seal the water flow passage and thus opens the venturi to outside air, providing a siphon-break preventing backflow when water is not flowing through it.

Despite the improvements that the '983 device is alleged to have made to venturi-type eductors, there are difficulties with that device. Sleeve wear and degradation occur over time periods shorter than desired and new parts are required. Degradation may be a result of large portions of the sleeve being forced through the air gaps or ports during water flow. As the sleeve is bulged outwardly and comes into contact with the rough edges of the housing, that relative motion results in abrasion to the sleeve, which leads to undue sleeve wear. Such degradation results in adverse performance and eventually complete failure of the system.

Debris in the water flow passage defined between the sleeve and the internal rigid barrel can prevent the sleeve from fully sealing on the barrel where water flow ceases. This can leave passages open to the undesirable contaminating backflow. Thus, debris in the water flow passage is significantly problematical.

Another problem with devices such as in the '983 patent is the tortuous water path. In that device, the water must flow into a rigid support barrel, make a right turn outwardly through ports toward the resilient sleeve, then make another right turn between the expanded sleeve and support barrel. The turbulence caused by this arrangement restricts the water flow capacity of the device.

Another problem with the '983 patented device is in the manner of the connection of the lower venturi section to the upper air gap/breaker section. These units are joined by hose end threads, making it too easy for the venturi to be disconnected and connected directly to a water source, but without the breaker. This eliminates the function and safety of the breaker, defeating the purpose of the device disclosed.

Moreover, this type of coupling makes the angular orientation of the backflow breaker and of the venturi section or rigid coupling. This may make alignment of the chemical inlet with the portions of the dispensing system a difficult, cumbersome task. Also, twisting of the outlet tube at the end of the venturi is restricted.

SUMMARY OF THE INVENTION

A preferred embodiment of the invention includes a backflow preventing eductor having an improved anti-backflow housing, a venturi section or housing, an improved resilient sleeve for sealing the system against backflow, an improved sleeve support barrel for directing water flow, and improved structure interconnecting the anti-backflow housing with the venturi housing.

More specifically, the improved anti-backflow housing is provided with elongated air vents in which cross-bars effectively define smaller vents or windows which are less susceptible for intrusion by the expanded sleeve which would prematurely wear the sleeve.

The improved resilient sleeve is contoured in thickness, tapering toward its distal end to a thinner wall section. The thinner section at the distal end is more compliant, providing a better seal around any debris in the water passage, and accommodating increased water flow for any given pressure over that provided by prior uniformly thick sleeves. The rigid sleeve support barrel has water outlet ports directed toward the sleeve. These ports are extended into the flange of the barrel, thus providing a straighter, less turbulent water path resulting in an increased flow, for any given size of barrel and openings, over the prior device.

A transition area in the anti-backflow housing supports the thinner distal end of the expanded sleeve at the lower end when the expanded sleeve seals against the housing. This, too, reduces wear of the sleeve on that seal where water is flowing in the sleeve.

Finally, the anti-backflow housing is rotatably secured together with the venturi section by a flange and seal so the venturi section can be rotated with respect to the anti-backflow, facilitating orientation of the chemical inlet and twisting of the outlet tube.

The above and other objects and advantages of the present invention shall be made apparent from the accompanying drawings and the description thereof.

DETAILED DESCRIPTION OF SPECIFIC EMBODIMENTS

Figure 1:
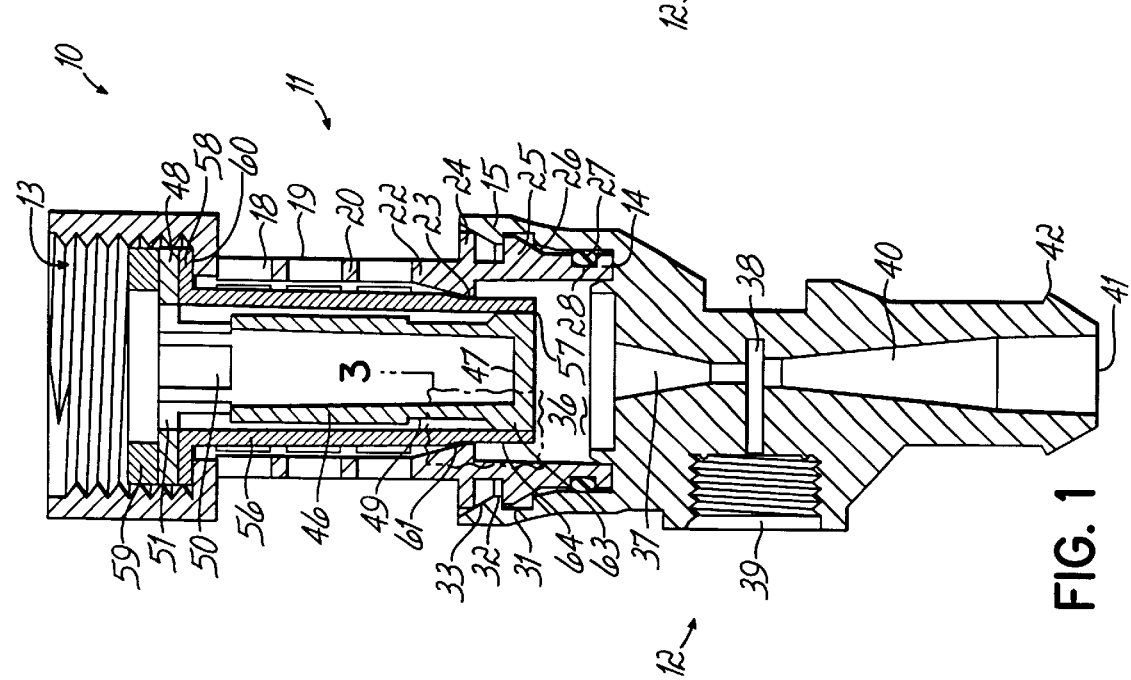
FIG. 1 shows the invention in its condition when water is not flowing.

Turning now to the drawings, there is shown in FIG. 1 an improved anti-backflow eductor 10 having an anti-backflow housing 11 and a venturi section or housing 12. Anti-backflow housing 11 includes an inlet end 13 comprising an internally threaded coupling for interconnection with a water supply, such as a faucet nozzle or hose end (not shown). Housing 11 includes a distal end 14 configured as will be described, for operative rotational interconnection to the inlet end 15 of the venturi housing or section 12.

The details of the anti-backflow housing 11 and the components associated therewith will now be described. Between the threaded coupling 13 and the distal end 14, the housing 11 includes a plurality of windows or ports 18 defined in sidewalls 19 of the housing 11. The windows are further defined in part by a series of crossbars 20 which extend across the elongated windows and serve to break up the larger windows into smaller openings or ports.

The distal end 14 of housing 11 is provided with an inwardly tapering section 22, as shown, leading smoothly to a seat 23, as will be described. A covering flange 24 extends radially outwardly from the housing 11. A shoulder 25 also extends radially outwardly from the housing 11. From the shoulder 25, a tapering surface 26 tapers inwardly for facilitating the insertion of the housing 11 into the venturi housing 12, as will be described. The O-ring seal 27 is disposed in a groove 28 for sealing against an internal surface of the venturi housing.

Figure 2:
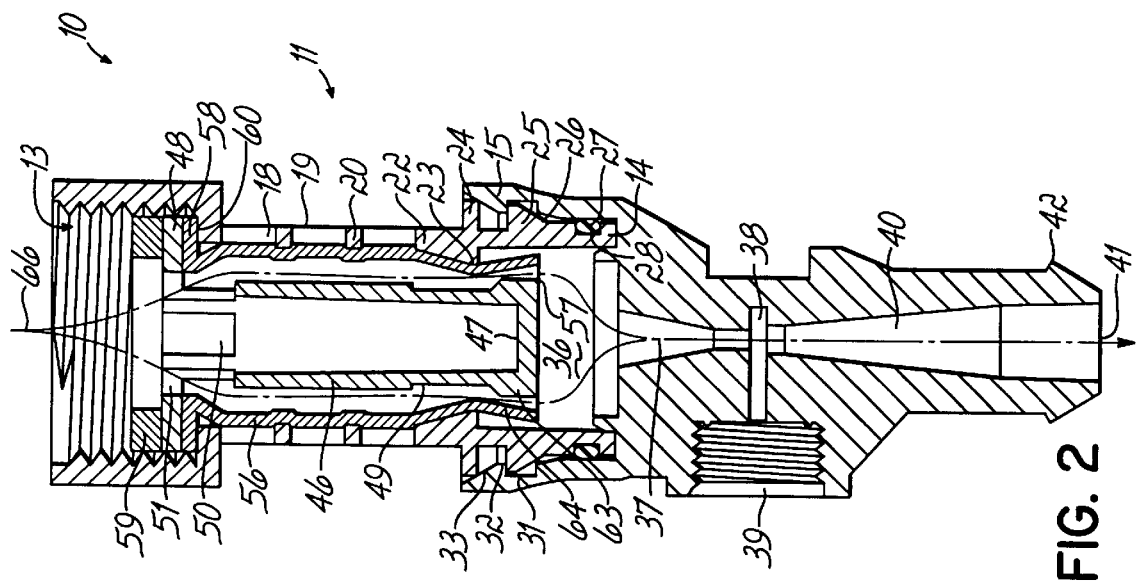
FIG. 2 shows the invention in its condition when water is flowing.

Proceeding now with the description of the venturi housing or section 12, the inlet end 15 is provided with a groove 31 for receiving the shoulder 25, as shown in FIGS. 1 and 2. The radial extent of the shoulder 25, extends outwardly past the internal surface 32, for rotationally capturing the air gap housing 11 within the venturi housing 12.

In particular, the internal surface 32 is a termination of inwardly tapering surface 33. The outer diameter of the shoulder 25 of housing 11 is greater than the inner diameter of the internal surface 32. When the housing 11 is assembled to the housing 12, the tapering surface 26, leading shoulder 25 thereof, engages the tapering surface 33 of the housing 12 and the dimensions are selected, such that there is a slight expansion of the surfaces 32 radially outwardly, allowing the placement of the shoulder 25 in the groove 31. The shoulder 25 snaps into groove 31. Thus, the anti-backflow housing 11 is not threaded into the venturi section 12, but during assembly, is snapped therein so that it is not removable. Moreover, it will be appreciated that the housing 11 is rotatable with respect to the venturi section 12, seal 27 providing sealing between the two.

The distal end 14 of the housing 11 defines a plenum 36 through which water flows into the venturi throat 37. Venturi throat 37 is in operative communication with a chemical inlet 38, which communicates with a threaded inlet 39 in the housing 12. Thereafter, the venturi housing includes an operably connected diverging passage 40 leading to an outlet 41 of the housing. At its distal end, the housing is provided with a flange 42, to facilitate securing the discharge end or outlet end 41 to a discharge hose for the diluted chemical mixture provided by operation of the eductor.

Turning now to a description of the fluid controlling components of the eductor 10 of FIGS. 1 and 2, it will be appreciated that the invention includes a barrel 46 disposed in anti-backflow housing 11. Barrel 46 has a blind end 47 and a radially outwardly extending flange 48. Barrel 46 is configured with a surrounding relieved area 49 and, at its upper end as shown in FIG. 1, comprises a plurality of windows 50 in the cylindrical barrel surface. The upper ends 51 of the windows 50 extend into the radially extending flange 48.

An elastomeric or resilient sleeve 56 made of any suitable resilient material surrounds the barrel 46. Sleeve 56 has an open discharge end 57 and a radially extending flange 58 at its inlet end.

As shown in FIG. 1, the sleeve 56 is snugly disposed on the barrel 46 in such a way that the barrel flange 48 overlies the sleeve flange 58. A seal 59, such as an elastomeric washer, is disposed in the coupling end 13, upstream of the barrel flange 48. Accordingly, a seal is provided between the shoulder 60 of the coupling 13 the sleeve flange 58, the barrel flange 48 and the seal 59.

Figure 3:
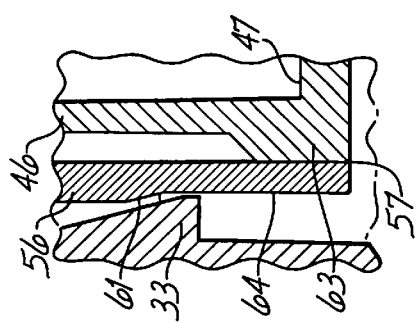
FIG. 3 is an enlarged view of the encircled area of FIG. 1.

As best seen in FIGS. 1 and 3, the sleeve 56, near its distal or discharge end 57, has a thin section 64, which is thinner in cross section than the upper part of the sleeve 56. This is provided by the taper 61 from the wider thickness of the sleeve down to the narrower thickness 64.

It will be appreciated that the barrel 46, at its blind end 47, has an enlarged end 63 which is greater in external diameter than upper portions of the barrel, as shown. Sleeve 56 seals around enlarged end 63 as shown in FIGS. 1 and 3.

As shown in FIG. 1 and more particularly in FIG. 3, when the eductor is at rest, or is not flowing water therethrough, the sleeve 56 engages and seals around the enlarged end 63 of the blind barrel 46 and the outer surfaces of the sleeve are slightly spaced from the tapering sections 22 of the anti-backflow housing 11 and the seat 23. Accordingly, the plenum 36 communicates around the exterior surface of the sleeve 56 and between the sleeve and the seat 23, with the windows or ports 18. The plenum 36 is thus vented to the ambient atmosphere. In this condition, where the sleeve seals around the enlarged end 63 of the blind end barrel 46, the plenum is vented and there is no back pressure in the system to withdraw any chemical from the venturi section 12 back up into the water supply. Moreover, any backflow is prevented by the sealing engagement of the sleeve 56 with barrel end 63.

It will be appreciated that the only avenue back to the water supply of the inlet or coupling end 13 is between the resilient sleeve 56 and the barrel 46, and through windows 50. Nevertheless, since the resilient sleeve 56 is now sealing the enlarged end 63 of the barrel, there is no passageway for any chemical or other fluids in the plenum 36 to communicate with the coupling 13 or the water supply associated therewith.

Turning now to FIG. 2, it will be appreciated that a water pressure has been applied to the coupling 13 to provide a flow 66 of water through the eductor 10. In this figure, it will be appreciated that the water flow is introduced to the upper end of the blind end barrel 46 and flows through the windows 50 outwardly toward the resilient sleeve 56. The water pressure expands the sleeve 56 outwardly so that water flows between the interior surface of the sleeve 56 and exterior surface of the barrel 46 and out into plenum 36 through the open discharge end 57 of the sleeve.

At the same time, the water pressure internally of the sleeve compresses the sleeve against the seat 23, which surrounds the sleeve, thereby sealing off the plenum 36 from the ports or air gaps 18. This prevents ingress of air into the water stream. The pressure of the water flow illustrated, for example, at 56, expands the open discharge end 57 of the resilient sleeve 56 to fill the plenum with pressurized water. From there, the water flow moves into the throat 37 of the venturi, creating a negative pressure at the chemical inlet 38, which draws up any chemical connected to the inlet 39 into the water flow. The mixed water and diluted chemical stream moves through the diverging passageway 40 to the outlet 41, which can be surrounded by a hose for dispensing end filling purposes.

It will be appreciated that the seal provided by the elastomeric sleeve 56 against the seat 23 facilitates the flow pressure of the water flow in the plenum 36 and through the venturi housing 12.

Moreover, it will be appreciated with respect to this water flow, that the windows 50 extend into the outwardly extending radial flange 48 of the barrel 46. In this manner, the water flow, as illustrated in FIG. 2, moves through a relatively gently bending path rather than at right angles. The flow is thus less turbulent than in prior devices. This results in the capacity to flow more water for any given sized system.

Moreover, it will be appreciated that the discharge end 57 of the elastomeric sleeve 56, together with the thinner wall thickness thereof, serves to provide a substantial seal against the seat 23 while, at the same time, being thin and thus relatively even more resilient. This better accommodates any debris which might be present in the water flow between the sleeve 56 and the enlarged end 63 of the blind barrel 46. Thus, when the water pressure or source is cut off, the sleeve resiliently returns to a sealing engagement with the enlarged end 63 of the barrel 46. Should there be any debris between the thinner wall section 64 of the sleeve at the enlarged end 63, the sleeve will tend to mold itself around and even further seal off any return passage through the open discharge end 57 while, at the same time, opening the passageways between the exterior surface of the sleeve 56 and the seat 23 to vent the plenum 36 through the windows or vents 18.

In addition, it will be appreciated that the interconnection of the anti-backflow housing 11 to the venturi housing 12 is a more permanent coupling than a threaded coupling for example, making the two sections difficult, if not impossible, to remove by the ordinary user. Thus, the venturi section 12 cannot be inadvertently or purposefully connected to a source of water supply without benefit of the anti-backflow function provided by the components in anti-backflow housing 11, including the barrel 46 and the sleeve 56.

Moreover, this interconnection nevertheless provides for some rotation capability between the anti-backflow housing 11 and the venturi section 12. This facilitates the orientation of the chemical inlet 39 in a desired angular position, regardless of the angular orientation of the housing 11 with respect to its coupling to the water source. Moreover, any twisting of the outlet tube (not shown) interconnected with the discharge outlet 41 of the venturi housing can be accommodated by this rotational movement.

Accordingly, the improved anti-backflow eductor 10 as disclosed above provides numerous features and enhancements not before available. Sealing of the system, when no water flow is present, has been enhanced, even in the presence of debris within the air gap eductor, to further insure there is no backdraft of any chemically-tainted fluid into the water supply.

Moreover, it will be appreciated that the construction of the anti-backflow housing 11, when taken together with the improved elastomeric sleeve 56 and the barrel 46, provides a number of advantages. First, with respect to the barrel, the extension of the top edges of the windows 50 into the radial flanges 48 provides for a more gentle, less tortuous water path and thus, for any particular size of components, relatively more water flow.

The construction of the housing 11 with the cross bars 20 provide adequate venting at the same time with relatively smaller windows. Thus, when the sleeve 56 is pressurized by water flowing through the system and pushed out against those vents 18 to seal them, the sleeves are not so flexed into the ports so relative motion between the sleeve and the port edges causes the sleeve to abrade against the sharp corners of the openings of the windows 18, as it would if those windows were larger. Thus the life of the sleeve is improved by reduction of the degradation and abrasion of its exterior surface.

As well, the tapering thin wall discharge portion of the sleeve permits better sealing of the sleeve with respect to the barrel and facilitates the seal of the sleeve against the seat 23, enhancing the overall function of the safety of the eductor and facilitating water flow.

The rotational, relatively non-detachable interconnection between the anti-backflow housing 11 and the venturi housing 12 facilitates the orientation of the eductor 10 with respect to the chemical source and with respect to the twisting of any discharge tube associated with the housing 12 while, at the same time, inhibiting the inadvertent or purposeful direct connection of the venturi section 12 to a water supply without benefit of the anti-backflow functions within the housing 11.

These and other modifications and advantages will become readily apparent to those of ordinary skill in the art without departing from the scope of this invention and the applicant intends to be bound only by the claims appended hereto.

What is claimed is:

1. An anti-backflow eductor comprising:
   a blind-end barrel having water outlet port therein;
   a resilient sleeve disposed on said barrel and sealing said port;
   said sleeve being expansible to allow water under pressure to flow outwardly of said port;
   said sleeve having a first wall thickness and a second wall thickness thinner than said first wall thickness proximate a water discharge end thereof.

2. The anti-backflow eductor of claim 1, further including:
   walls defining an anti-backflow housing;
   said barrel and sleeve disposed in said housing;
   elongated air vents disposed in said walls; and
   cross bars extending across said air vents and defining a plurality of air vents in said walls.

3. The anti-backflow eductor of claim 1 further including:
   walls defining an anti-backflow housing;

said barrel and sleeve operably disposed within said housing;

air vents in said walls, and a tapered seat;

said sleeve disposed on said barrel being expansible to seal against said seat when water is forced between said sleeve and said barrel.

4. The anti-backflow eductor of claim 1 wherein said barrel includes a radially extending flange at an inlet end, said port being defined in part in said barrel and in part in said flange.

5. An anti-backflow eductor as in claim 1 and further comprising:

walls defining an anti-backflow housing, said barrel and sleeve disposed in said housing;

said walls also defining a tapered seat and said sleeve being expansible to engage and seal on said seat when water is forced between said sleeve and said barrel;

a venturi housing for receiving water flow downstream of said sleeve and barrel, and drawing up a second fluid into said flow; and a rotatable coupling rotatably securing said anti-backflow housing to said venturi housing with said housings being rotatable with respect to each other, and permanently secured to each other.

6. An anti-backflow eductor comprising:

a blind-end barrel having an exterior surface and a water outlet port therein;

a resilient sleeve disposed on said exterior surface of barrel and sealing said port;

said sleeve defining a water discharge annulus about said barrel at a water discharge end of said sleeve;

said sleeve being expansible away from said surface to allow water under pressure to flow outwardly of said port and between said sleeve and said exterior surface of said barrel;

said sleeve having a first wall thickness and a second wall thickness thinner than said first wall thickness proximate a water discharge end thereof.

7. An anti-backflow eductor as in claim 6 further including a ported housing surrounding said barrel and sleeve, a seat in said housing proximate said water discharge end of said sleeve, said second wall thickness of said sleeve being engageable with said seat.

8. An anti-backflow eductor as in claim 7 wherein said first wall thickness of said sleeve is disposed proximate ports in said housing.

* * * * *